US007550884B2

United States Patent
Nomura et al.

(10) Patent No.: US 7,550,884 B2
(45) Date of Patent: Jun. 23, 2009

(54) BRUSHLESS MOTOR

(75) Inventors: Masashi Nomura, Kyoto (JP); Masamichi Nagata, Kyoto (JP)

(73) Assignee: Nidec Corporation, Kyoto (JP)

( * ) Notice: Subject to any disclaimer, the term of this patent is extended or adjusted under 35 U.S.C. 154(b) by 25 days.

(21) Appl. No.: 11/753,157

(22) Filed: May 24, 2007

(65) Prior Publication Data
US 2007/0273238 A1 Nov. 29, 2007

(30) Foreign Application Priority Data
May 26, 2006 (JP) ............... 2006-146295

(51) Int. Cl.
H02K 7/00 (2006.01)
H02K 5/16 (2006.01)
H02K 5/00 (2006.01)
(52) U.S. Cl. ............ 310/67 R; 310/80; 310/89; 310/90; 310/91; 310/217
(58) Field of Classification Search ............ 310/67 R, 310/90, 91, 179, 216, 254, 51, 65, 89
See application file for complete search history.

(56) References Cited

U.S. PATENT DOCUMENTS

| 4,316,225 A * | 2/1982 | Maruyama et al. ...... 360/271.4 |
| 4,519,010 A * | 5/1985 | Elsaesser et al. ......... 360/99.08 |
| 4,604,665 A * | 8/1986 | Muller et al. ............ 360/97.02 |
| 4,858,044 A * | 8/1989 | Crapo ..................... 360/99.08 |
| 5,562,347 A * | 10/1996 | Hsieh ........................ 384/215 |
| 6,348,753 B1 * | 2/2002 | Sakai et al. .................. 310/254 |
| 6,876,118 B2 * | 4/2005 | Enomoto et al. ............ 310/180 |
| 2005/0104464 A1 * | 5/2005 | Fujii et al. ..................... 310/90 |
| 2005/0200225 A1 * | 9/2005 | Kim et al. .................... 310/217 |
| 2006/0267435 A1 * | 11/2006 | Lin et al. ...................... 310/90 |

FOREIGN PATENT DOCUMENTS

| JP | 2006-25537 A | 1/2006 |
| JP | 2006-60902 A | 3/2006 |
| JP | 2006-158013 A | 6/2006 |
| JP | 2006-158056 A | 6/2006 |
| JP | 2006-187109 A | 7/2006 |

* cited by examiner

Primary Examiner—Quyen Leung
Assistant Examiner—John K Kim
(74) Attorney, Agent, or Firm—Westerman, Hattori, Daniels & Adrian, LLP.

(57) ABSTRACT

A cutout portion is formed at an outer peripheral side of a stator placing portion provided in a bearing bush for placing a core back portion of a stator. A connecting wire portion of a coil of the stator is inserted through a gap formed between the cut-out portion and the core back portion. The connecting wire portion is, therefore, prevented from being caught between a lower surface of the core back portion and an upper surface of the stator placing portion when the stator is secured on the stator placing portion by a first fixing member.

18 Claims, 10 Drawing Sheets

1

BRUSHLESS MOTOR

BACKGROUND OF THE INVENTION

1. Field of the Invention

The present invention relates to a motor, and more particularly, to a brushless motor which is required to be compact and high-power, such as those mounted in office automation equipment.

2. Description of the Related Art

As consumer demand has been increasingly shifting from a monochrome image to a color image in recent years, the office automation equipment such as copiers and laser beam printers is required to output images with high precision. Since formation of the color image on paper takes considerable time, high-speed printing is also desired. To meet these demanding requirements, a tandem system is employed to realize high-speed printing of the color image, where a plurality of photosensitive drums are arranged in series with respect to a feeding direction of the paper in formation images. It is, however, contrary to the continuing demand for downsizing the office automation equipment to provide a plurality of photosensitive drums, as it leads to an increase in size of the equipment. Hence, it is necessary to reduce the space for arranging other components in order to achieve both the high-speed printing and the downsizing of the office automation equipment. Therefore, it is required that the brushless motor, which takes a large installation space and is a main drive source of various types of mechanisms, be thinner, smaller, and high-power. Further, reduction in price of the brushless motor is also expected, against the backdrop of recent price reduction of the office automation equipment.

Configurations of conventional brushless motors will be described with reference to FIGS. 9 and 10. FIGS. 9 and 10 are cross-sectional views of exemplary conventional brushless motors, taken along an axial direction.

A brushless motor 1 shown in FIG. 9 includes a shaft 2 which rotates about a center axis, ball bearings 3 which rotatably support the shaft 2 and are spaced apart from each other, a bearing bush 4 which holds the ball bearings 3, a stator 5 which is formed by stacking a plurality of thin plates and is fixed outside the bearing bush 4 in a radial direction perpendicular to or substantially perpendicular to the axial direction, and a circuit board 6 disposed axially above the stator 5.

The fixing of the bearing bush 4 and the stator 5 to each other is performed by plastic working such as crimping, in such a way that an axially lower end portion 4a of the bearing bush 4 is deformed radially outward. Thus, a recess 5a is formed at the radially inner side of the stator 5 to receive the lower end portion 4a of the bearing bush 4. Due to the need to form the recess 5a, it is not possible to form the stator 5 by using the thin plates of the same shape. That is, both first thin plates 5b not used for forming the recess 5a and second thin plates 5c used for forming the recess 5a must be prepared to form the stator 5. There arises, therefore, a problem of lowering of production efficiency and increase in manufacturing cost, in comparison with the case of forming the stator by stacking thin plates of the same shape.

Moreover, the lower end portion 4a of the bearing bush 4 is formed by a portion of a ball bearing housing portion 4b which houses the ball bearing 3, as shown in FIG. 9. Thus, the circularity of the inner side surface of the ball bearing housing portion 4b is lowered when the lower end portion 4a is deformed. The lowering of circularity may cause such a defect both that the ball bearings 3 cannot be housed in the ball bearing housing portion 4b. And besides, when the lower end portion 4a is plastically deformed after the ball bearings 3 are housed within the ball bearing housing portion 4b, a force is applied radially inward to the outer ring of the ball bearing 3. This may cause degradation in characteristics of the ball bearing 3, or may cause such a defect that an abnormal noise occurs from the ball bearing 3 during the rotation of the brushless motor 1.

In addition, since high-performance is required for the brushless motor that is used in the office automation equipment, the bearing bush 4 and the stator 5 may separate from each other due to vibration that occurs in the stator 5, an impact applied from the outside, or the like, as long as fixing of the bearing bush 4 and the stator 5 to each other is achieved by plastic deformation such as crimping.

It is, therefore, desired to use a fixing member having a strong fixing power such as screws to fix the bearing bush 4 and the stator 5, especially in the brushless motor required to be high-power.

Next, a brushless motor in which a fixing member 8 such as a screw is used for fixing a bearing bush 4A and a stator 5A to each other is described with reference to FIG. 10.

Referring to FIG. 10, a stator placing portion 4Aa on which the stator 5A is placed is formed on the outer side surface of the bearing bush 4A. The stator 5A includes a stator core 5Ab and a coil 5Ac. The stator core 5Ab includes an annular core back portion 5Ab1 formed of a plurality of stacked thin plates and a plurality of teeth 5Ab2 extending outward from the core back portion 5Ab1 in the radial direction. The coil 5Ac is formed by winding a conductive wire around each tooth 5Ab2 of the stator core 5Ab multiple times. The conductive wire forming the coil 5Ac has a connecting wire portion (not shown) for connecting the plurality of teeth 5Ab2. The conductive wire is made of a conductor (not shown) which conducts electric current and of an insulating coating (not shown) for electrically isolating the conductor. The stator placing portion 4Aa is in contact with the entire surface of the core back portion 5Ab1. The fixing member 8 is inserted through the stator 5A such that it holds the stator 5A with the stator placing portion 4Aa, and is fastened in the stator placing portion 4Aa.

In the configuration shown in FIG. 10, the stator placing portion 4Aa is in contact with the entire surface of the core back portion 5Ab1. Thus, the connecting wire portion may be caught between the core back portion 5Ab1 and the stator placing portion 4Aa. A pinching force applied to the connecting wire portion is increased by the fastening force applied by the fixing member 8. Therefore, disconnection of the connecting wire portion or a short circuit due to separation of the insulating coating from the conductor may be caused.

If the distance in the radial direction between the stator 5A and the core back portion 5Ab1 is shortened especially by downsizing of the brushless motor, the connecting wire portion may be caught between the core back portion 5Ab1 and the stator placing portion 4A even more frequently.

SUMMARY OF THE INVENTION

A motor according to a preferred embodiment of the present invention includes a rotor portion which rotates about a predetermined center axis, a bearing unit which rotatably supports the rotor portion, a base which holds the bearing unit, and a stator which is fixed to the base.

The base is provided with a stator placing portion on which the stator is placed. The stator is secured on the stator placing portion with a fixing member.

The stator has a penetrating portion for insertion of the fixing member. The stator includes a stator core having a plurality of teeth, a coil formed by winding a conductive wire around each tooth, and a connecting wire portion formed by a portion of the conductive wire and crossing from a tooth to an adjacent tooth while retaining a conductive state.

The connecting wire portion is not caught axially between the stator placing portion and the stator.

With this structure, the connecting wire portion is not caught between a core back portion of the stator and the stator placing portion. Thus, a problem with the aforementioned conventional motors, such as disconnection of the connecting wire portion or a short circuit can be prevented from occurring even when the stator is fixed with the fixing member. Further, the connecting wire portion is prevented from being caught between an enlarged portion of the fixing member and the stator, when the connecting wire portion is disposed on the side of the stator placing portion, namely, the side axially opposite to the enlarged portion of the fixing member.

A circuit board fixing portion is arranged axially below the base, and fixes a circuit board thereto, and extends radially outward. The circuit board fixing portion and the circuit board are fixed to each other by means of a fixing member. The fixing member is disposed between the teeth adjacent to each another. At least a portion of the coil is located on an extension of a line radially connecting the fixing member and the center axis to each other.

With this configuration in which the fixing member is disposed between the teeth adjacent to each another, a central portion where the coil has the largest thickness in the axial direction can be circumvented, thereby enabling reduction of the distance between the stator and the circuit board. Therefore, it becomes possible to make the brushless motor thinner. Especially when at least a portion of the fixing member overlaps with the coil in the radial direction, the distance between the stator and the circuit board may be further reduced, and a thinner brushless motor can thus be realized.

DETAILED DESCRIPTION OF THE PREFERRED EMBODIMENTS

Figure 1:
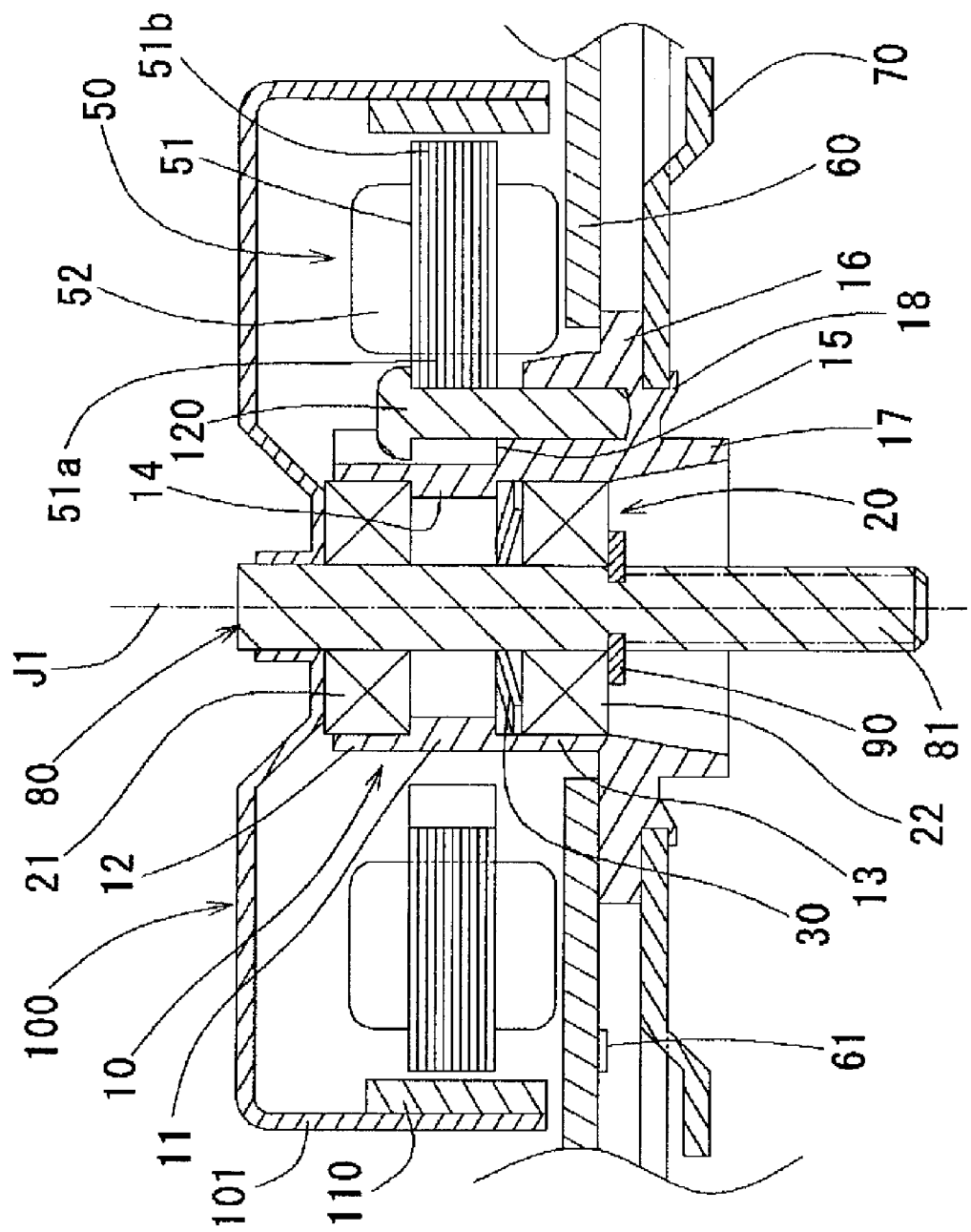
FIG. 1 is a cross-sectional view of a brushless motor according to a preferred embodiment of the present invention, taken along an axial direction.

Referring to FIGS. 1 through 8, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

<Overall Structure of Brushless Motor>

The overall structure of a brushless motor according to a preferred embodiment of the present invention is described with reference to FIG. 1. FIG. 1 is a cross-sectional view of the brushless motor, taken along its axial direction parallel to or substantially parallel to its center axis J1.

As shown in FIG. 1, a bearing bush 10 is a hollow member which is formed by die casting aluminum material, for example. The inner surface of a hollow body 11 of the bearing bush 10 forms an approximately perfect circle as seen along the center axis J1. The inner surface of the body 11 is provided with ball bearing housing portions 12 and 13 formed thereon for housing ball bearings 21 and 22, respectively. The ball bearings 21 and 22 are arranged to be separated from each other in the axial direction, and form a bearing unit 20 which will be described later. Between the ball bearing housing portions 12 and 13 in the axial direction, an inward projection 14 is formed to extend inward in a radial direction perpendicular to or substantially perpendicular to the center axis J1. The axially upper surface and the axially lower surface of the inward projection 14 define axial positions of the ball bearings 21 and 22, respectively.

The ball bearings 21 and 22 are respectively secured in the ball bearing housing portions 12 and 13 by press fitting, adhesive bonding, or a combination thereof, for example. A preload spring 30 is disposed axially between the ball bearing 22 and the axially lower surface of the inward projection 14.

The body 11 of the bearing bush 10 is provided with a stator placing portion 15 formed on an outer surface thereof. The stator placing portion 15 is formed integrally with the body 11. The stator placing portion 15 has a substantially flat surface perpendicular to or substantially perpendicular to an extending direction of the body 11, i.e., the axial direction. On the stator placing portion 15, a stator 50 described below is to be placed.

The stator 50 includes a stator core 51 having a plurality of stacked thin steel plates made of magnetic material. The stator core 51 includes an annular core back portion 51a (at a position radially inside dotted line in FIG. 1) and a plurality of teeth 51b (at a position radially outside dotted line in FIG. 1) extending radially outward from the side surface of the core back portion 51a and separated from one another in a circumferential direction. A conductive wire is wound around each tooth 51b multiple times to form a coil 52. A portion of the stator core 51, in particular, a portion around which the conductive wire is wound is coated with insulating material.

Axially below the stator placing portion 15 of the bearing bush 10, a circuit board placing portion 16 on which a circuit board 60 is to be placed is formed integrally with the hollow body 11 of the bearing bush 10. The circuit board placing portion 16 extends in the radial direction.

On the lower surface side of the circuit board placing portion 16, a spigot joint portion 17 and an outer peripheral protrusion 18 are formed. The spigot joint portion 17 extends axially downward. The outer surface of the spigot joint portion 17 defines a substantially cylindrical hollow. The outer peripheral protrusion 18 protrudes radially outward from the spigot joint portion 17 and extends axially downward and is used for fixedly holding an attachment plate 70 to be described below by plastic deformation such as crimping.

The attachment plate 70 is formed from a thin steel plate via plastic working such as press working, and is used for attaching the brushless motor of this preferred embodiment to an installation member (not shown) in a device on which the brushless motor is mounted. The attachment plate 70 has a hole formed therein which has approximately the same diameter as the outer diameter of the outer peripheral protrusion 18 before being subjected to the plastic deformation. When the outer peripheral protrusion 18 is inserted through the hole of the attachment plate 70, the attachment plate 70 comes into contact with the lower surface of the circuit board placing portion 16. With the attachment plate 70 in contact with the circuit board placing portion 16, the outer peripheral protrusion 18 is deformed radially outward, thereby holding and fixing the attachment plate 70 between the circuit board placing portion 16 and the outer peripheral protrusion 18.

To the radially inner surfaces (center-axis side surfaces) of the ball bearings 21 and 22, a shaft 80 rotatable about the center axis J1 is fixed by adhesive bonding, press fitting, or a combination thereof, for example. A retaining member 90 for preventing separation of the shaft 80 from the ball bearings 21 and 22 is fixed to a portion of the shaft 80 that corresponds to the axially lower surface of the ball bearing 22. A gear 81 which can engage with a gear of another member (not shown in FIG. 1) is provided axially below the retaining member 90.

A rotor holder 100 is press-fitted to the axially upper portion of the shaft 80. The rotor holder 100 has a hollow, approximately cylindrical shape and is formed by processing a thin plate of magnetic material via plastic working such as press working. The rotor holder 100 encloses the stator 50. An annular rotor magnet 110 is secured to the inner side surface of a cylindrical portion 101 of the rotor holder 100 by bonding. The rotor magnet 110 is made of neodymium material. The inner side surface and the lower end surface of the cylindrical portion 101 are magnetized. The use of neodymium material reduces the volume of the rotor magnet 110 and provides a high magnetic property at the same time. The reduced volume of the rotor magnet 110, therefore, contributes to size reduction of the brushless motor. The axially lower end surface of the rotor magnet 110 faces the upper surface of the circuit board 60 in the axial direction with a gap formed therebetween. The inner side surface of the rotor magnet 110 faces the outer side surface of the teeth 51b of the stator 50 in the radial direction with a gap formed therebetween.

An FG (Frequency Generation) pattern (not shown) is formed on the circuit board 60 at a position which faces the axially lower end surface of the rotor magnet 110. On the lower surface of the circuit board 60, three Hall elements 61 are soldered at positions radially inside of the inner side surface of the rotor magnet 110. The Hall elements 61 are arranged at an interval of a predetermined angle in the circumferential direction. Highly precise rotation control is thus realized by the FG pattern and the Hall elements 61.

With electric current flows through the coil 52 of the stator 50, a magnetic field is generated in the coil 52. The interaction between the magnetic field and the rotor magnet 110 provides a driving force for rotation.

Since the brushless motor of this preferred embodiment is a high-power motor with an output of about 10 W to about 30 W, it is desirable that the brushless motor be mounted on the office automation equipment such as a laser beam printer or a copier, in which rotary torque is transmitted via the gear 81 of the shaft 80 to another member (not shown) that includes a gear to engage with the gear 81, and the other member further engages with many other members to thereby drive various types of mechanisms.

<Relation Between Bearing Bush 10 and Stator 50>

Figure 2:
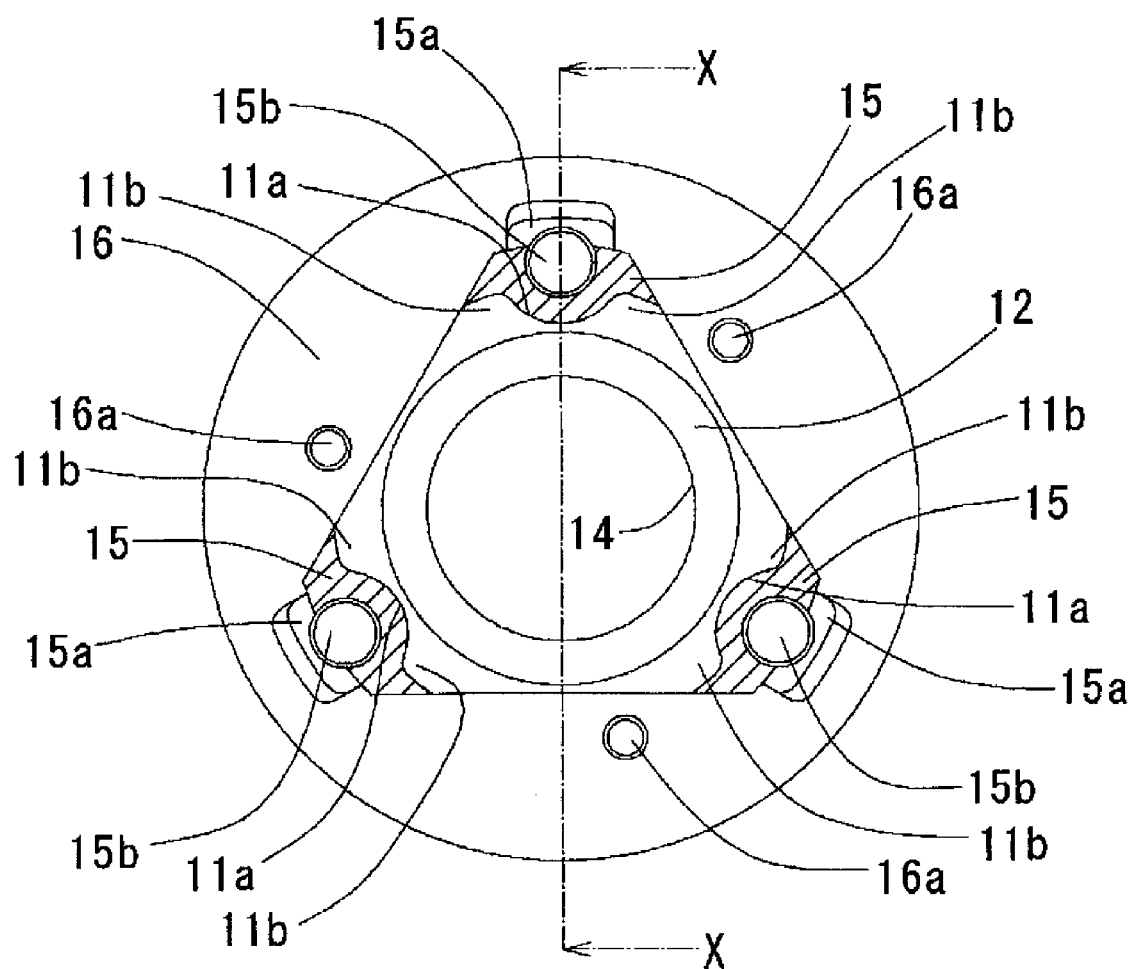
FIG. 2 is a top view of a bearing bush in the brushless motor of FIG. 1.
Figure 3:
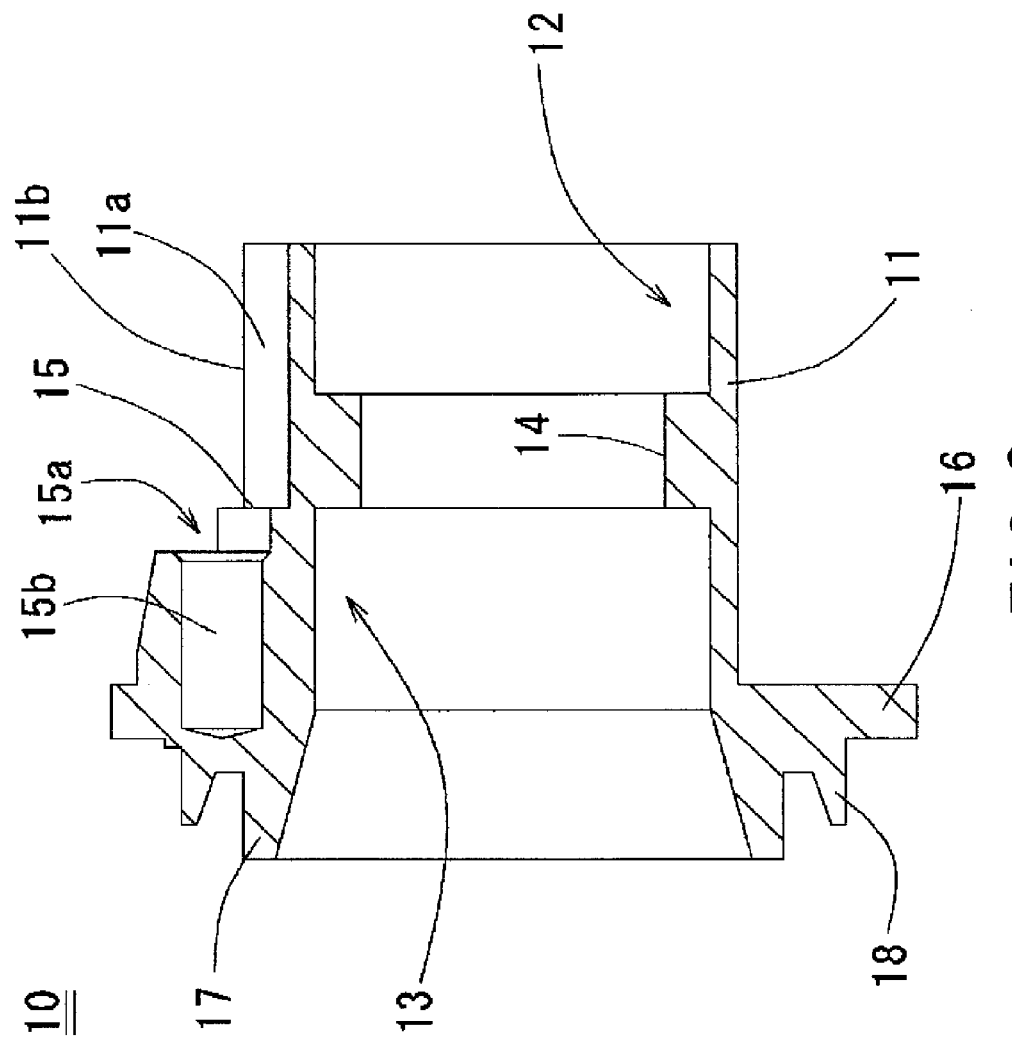
FIG. 3 is a cross-sectional view of the bearing bush of FIG. 2, taken along an axial direction.
Figure 4:
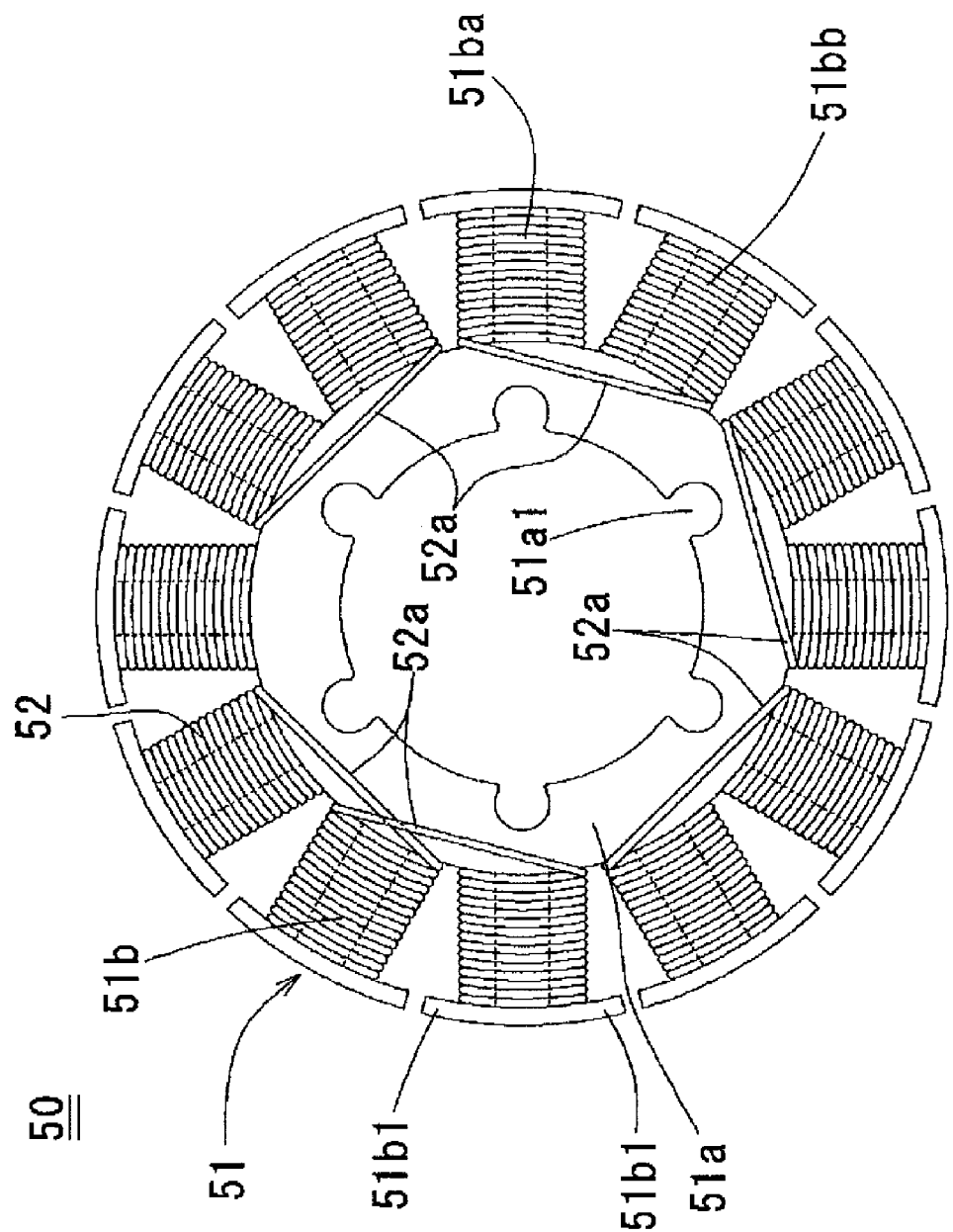
FIG. 4 is a bottom view of a stator in the brushless motor of FIG. 2.
Figure 5:
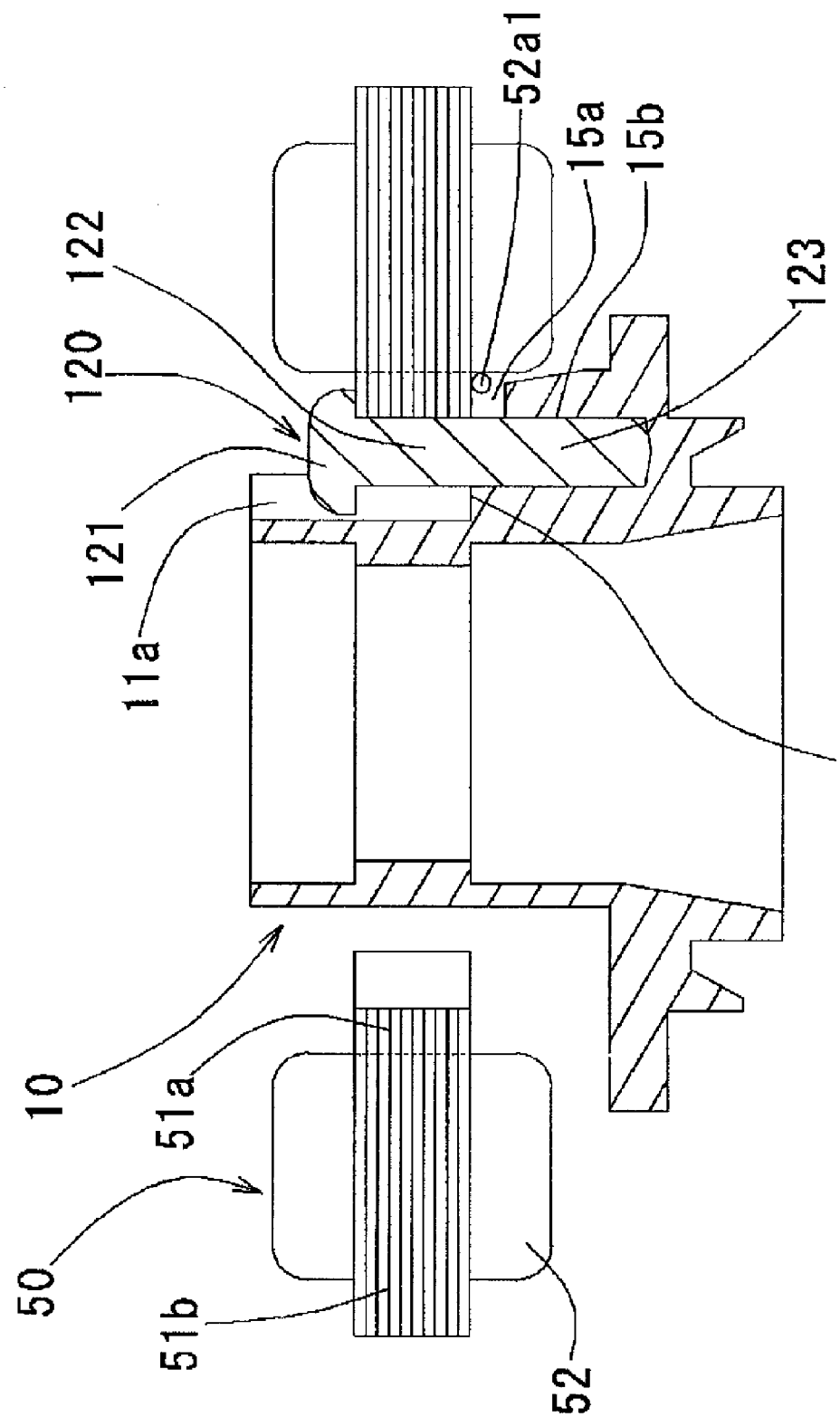
FIG. 5 is a cross-sectional view of the bearing bush and the stator fixed to each other, taken along an axial direction.
Figure 6:
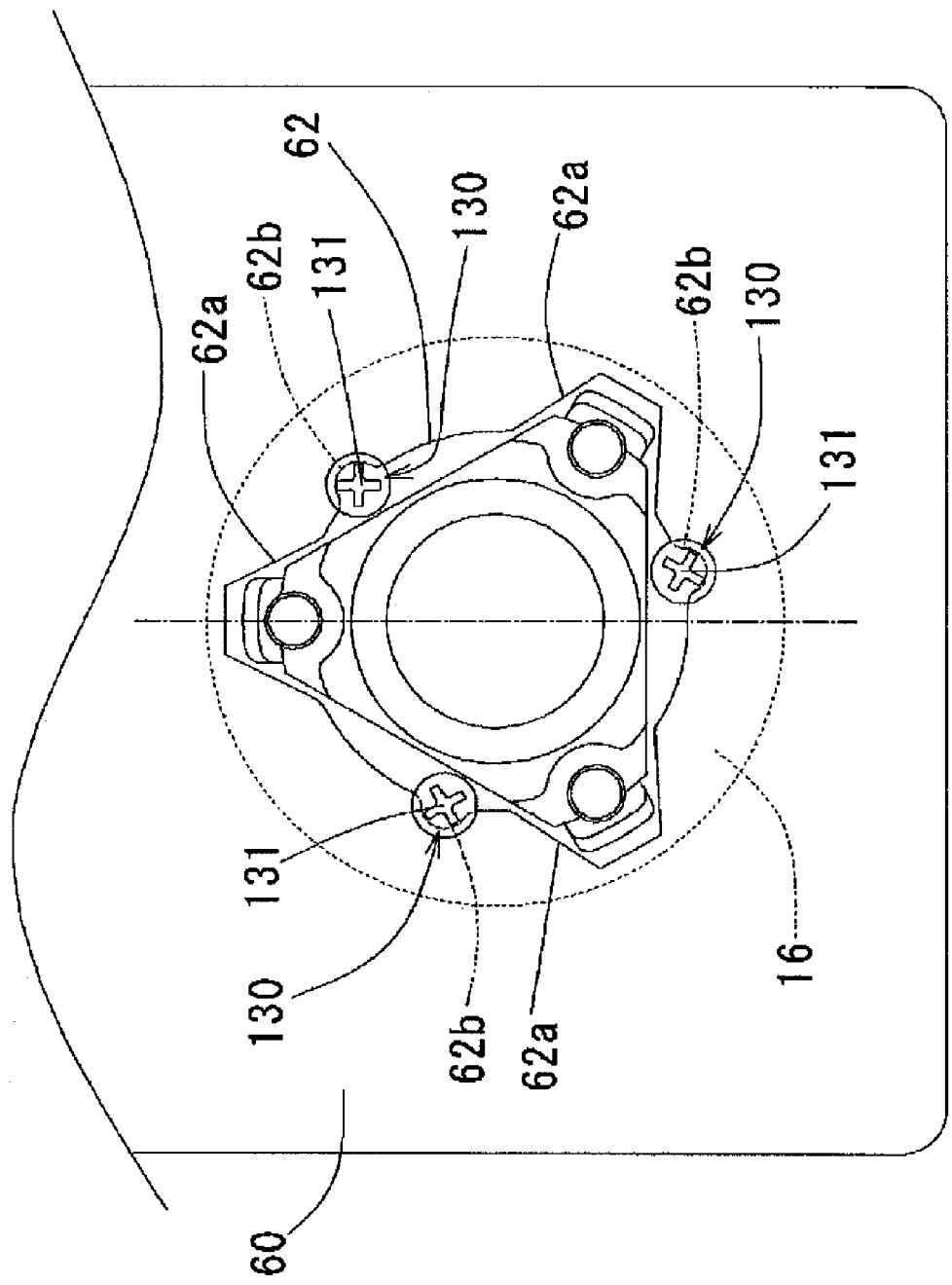
FIG. 6 is a top view showing a state in which a circuit board and the bearing bush are fixed.
Figure 7:
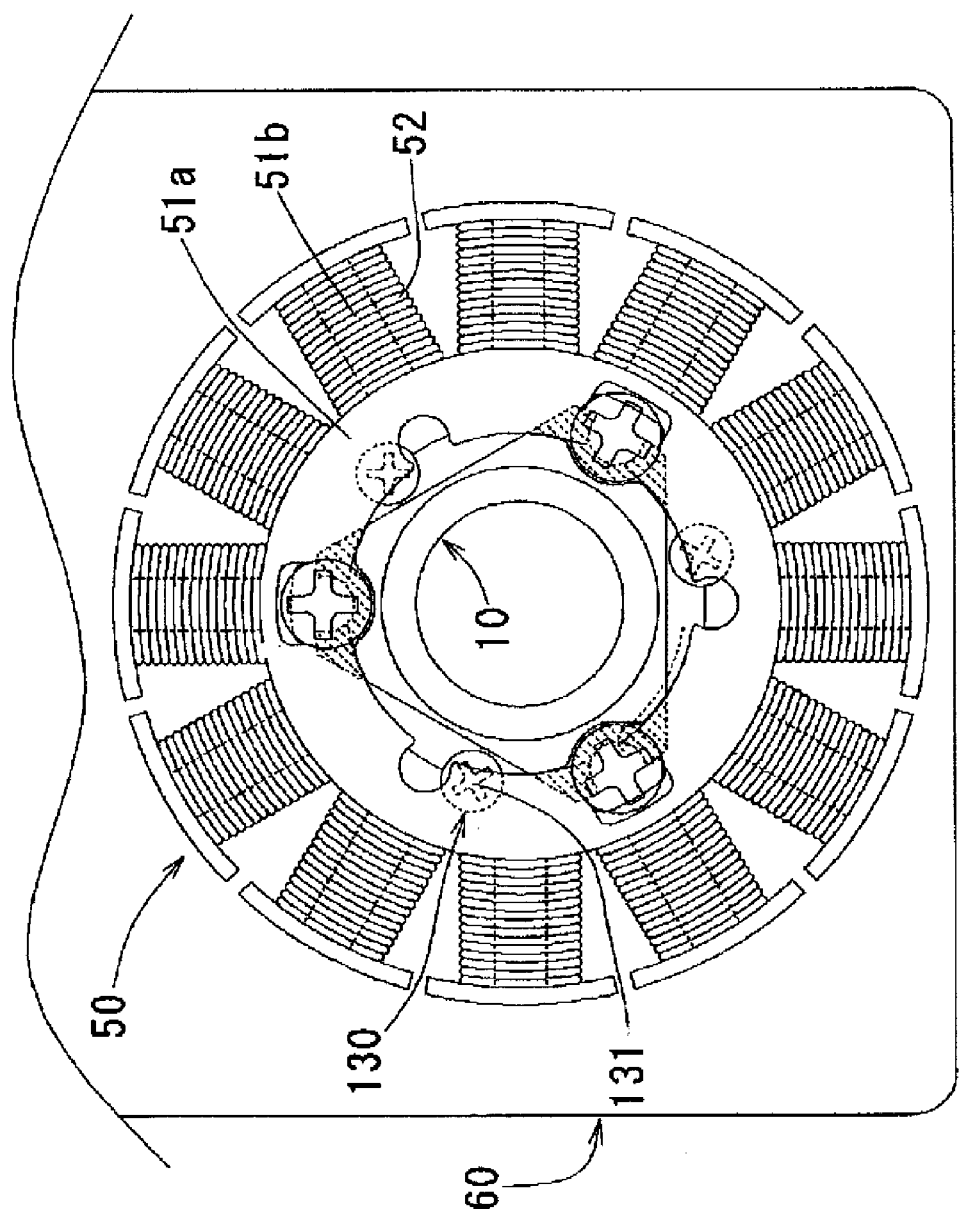
FIG. 7 is a top view showing a state in which the stator is fixed to the structure of FIG. 6.
Figure 8:
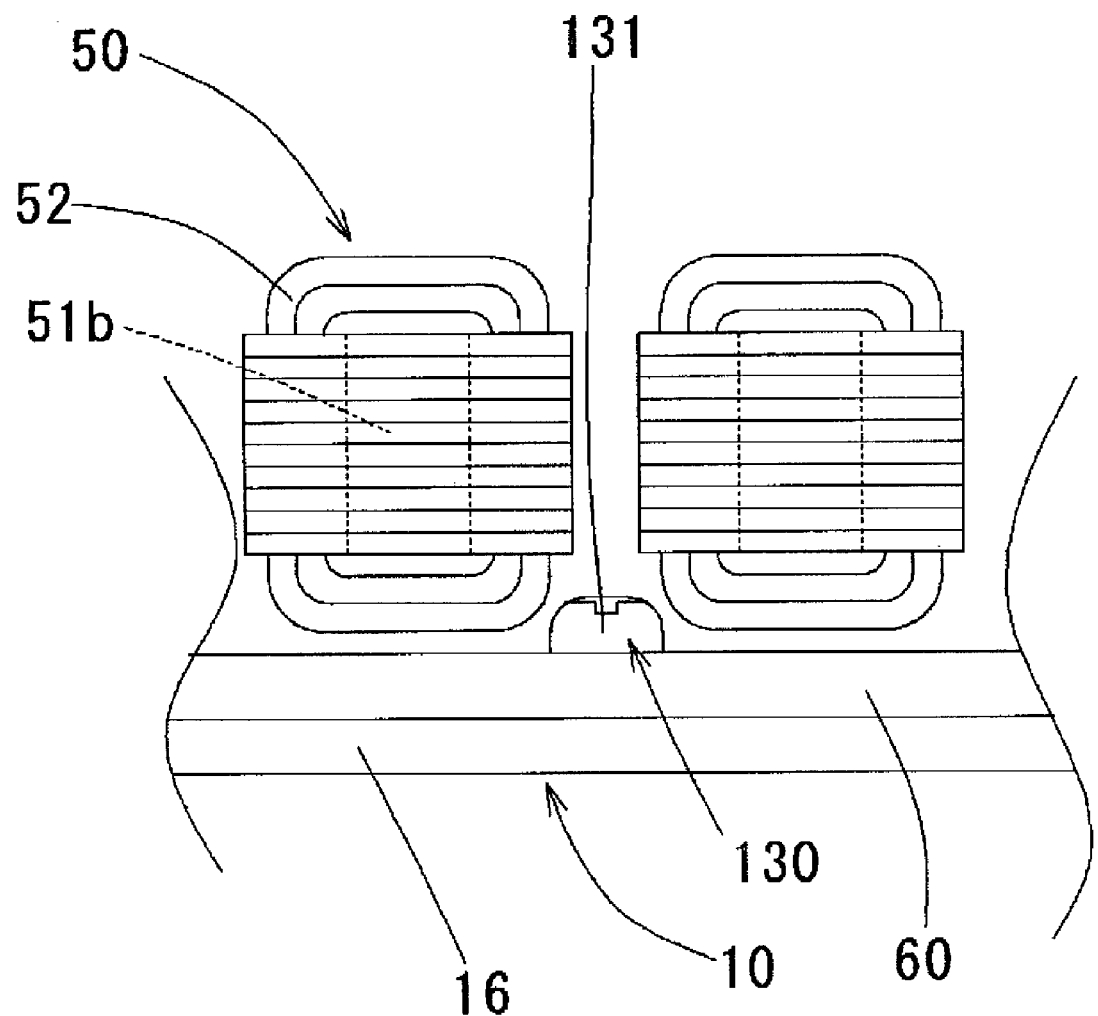
FIG. 8 is an exemplary view showing a side surface of the structure of FIG. 7.
Figure 9:
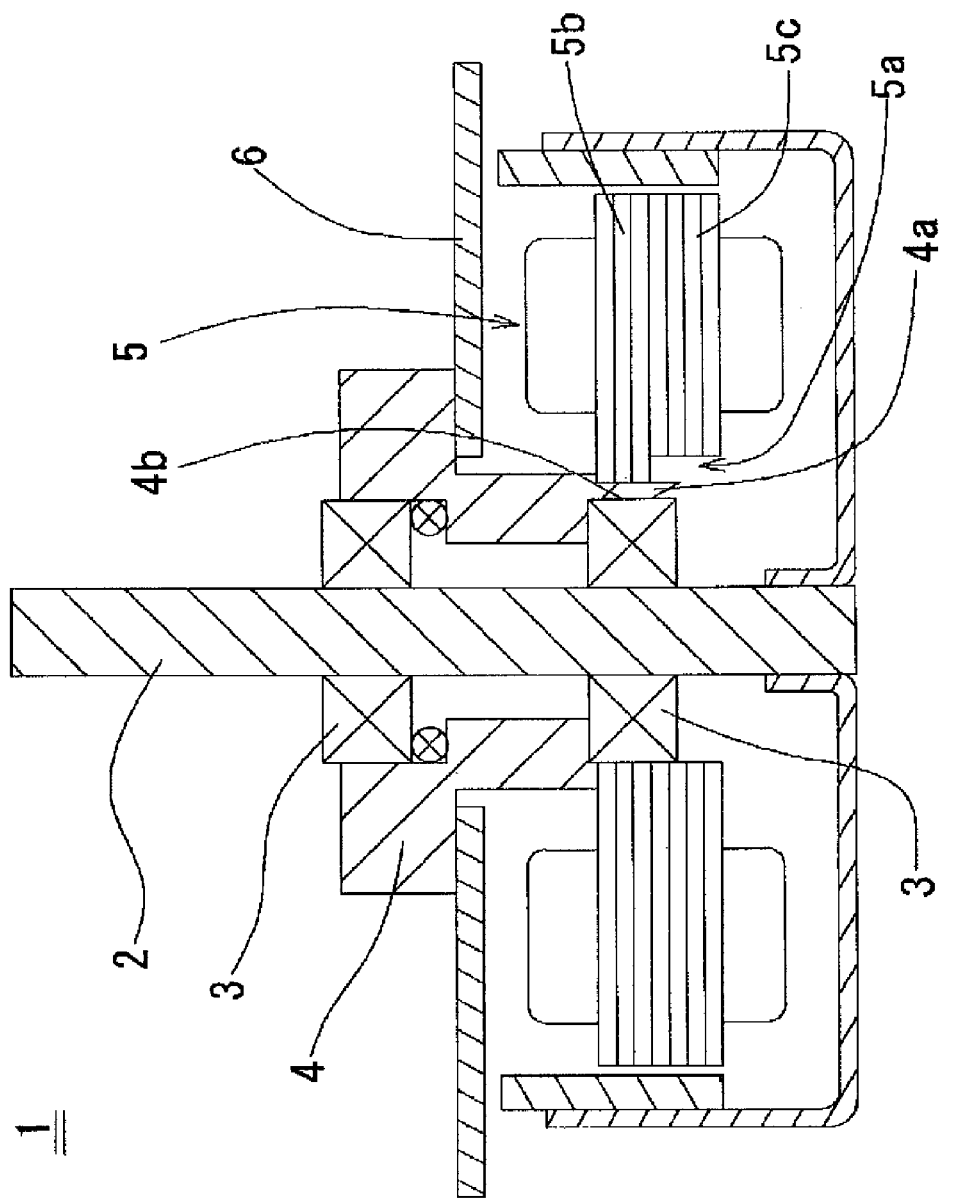
FIG. 9 is a cross-sectional view of an exemplary conventional brushless motor, taken along its axial direction.
Figure 10:
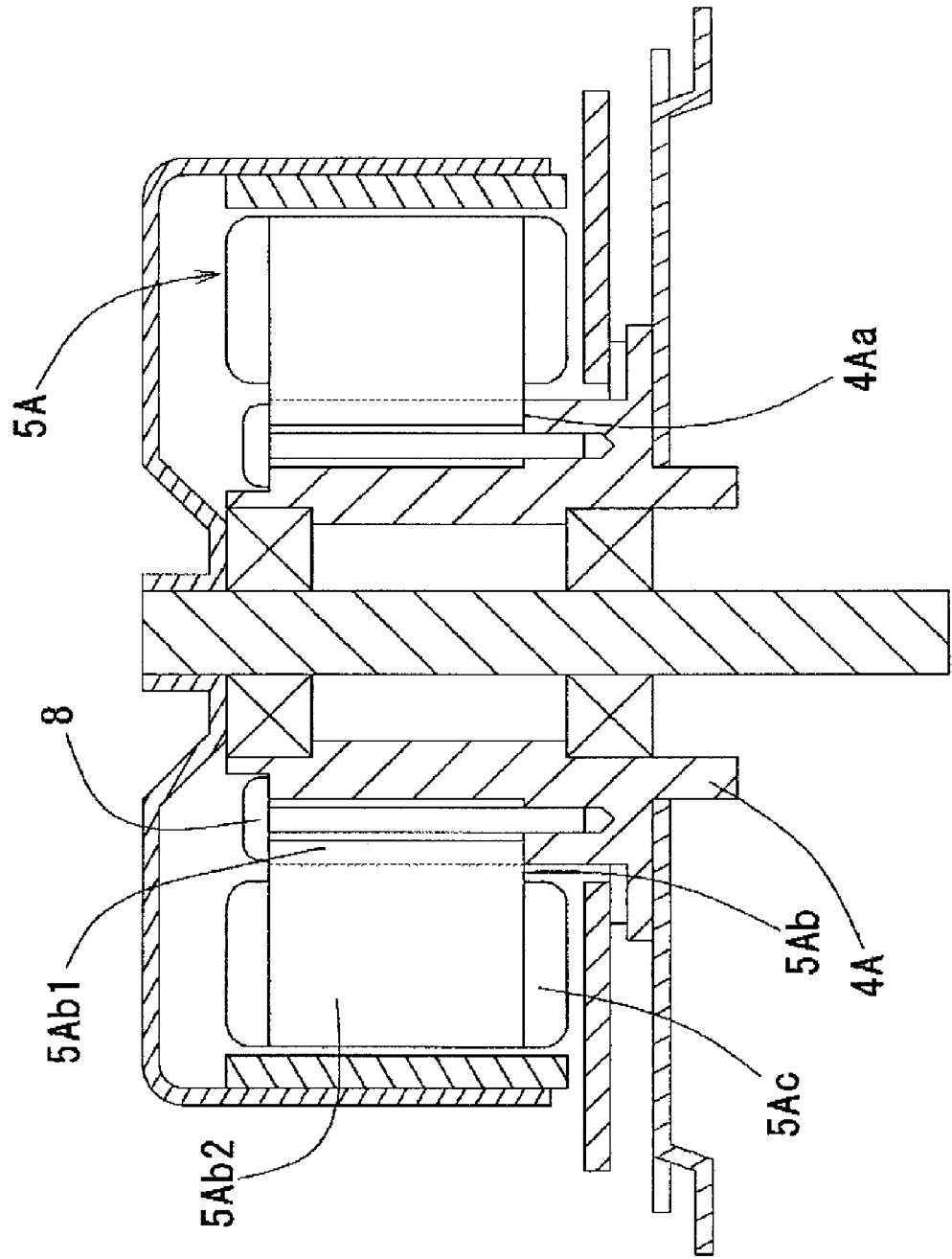
FIG. 10 is a cross-sectional view of another exemplary conventional brushless motor, taken along its axial direction.

Next, the relation between the bearing bush 10 and the stator 50 in the brushless motor of this preferred embodiment is described with reference to FIGS. 2 to 8. FIG. 2 is a top view of the bearing bush 10. The hatched portions in FIG. 2 represent the stator placing portion 15. FIG. 3 is a cross-sectional view of the bearing bush 10 of FIG. 2, taken along line x-x and viewed in the direction of arrows. FIG. 4 is a bottom view of the stator 50 of the brushless motor of this preferred embodiment. FIG. 5 is a cross-sectional view of the bearing bush 10 with the stator 50 fixed thereto, taken along the axial direction. FIG. 6 is a top view of a fixing structure which fixes the circuit board 60 and the bearing bush 10 to each other. FIGS. 7 and 8 are a top view and a side view, respectively, of the fixing structure of FIG. 6 to which the stator 50 is fixed.

Referring to FIG. 3, a cutout portion 15a is formed on the outer peripheral side of the stator placing portion 15 of the bearing bush 10. In the stator placing portion 15, an opening hole 15b extending axially downward is formed from the upper surface of the stator placing portion 15. The radially outer edge of the opening hole 15b is located radially outside of the radially outer edge of the stator placing portion 15.

Referring to FIG. 2, three stator placing portions 15 are arranged to be spaced apart from one another at equal angular interval, i.e., 120-degree interval (see the hatched parts in FIG. 2). The outer shape of the body 11 is approximately triangular when seen in the axial direction. At each of the apexes of the approximately triangular shape, the stator placing portion 15 is provided. At circumferential positions on the body 11 which correspond to the opening holes 15b of the stator placing portions 15 are formed concave portions 11a each of which is depressed radially inward. Please note that "circumferential positions corresponding to each other" in this specification means positions located in the same radial direction from the center axis J1 but may be located at different distances from the center axis. At both sides of each concave portion 11a in the circumferential direction, bulge-shaped center adjusting portions 11b are formed. The center adjusting portions 11b have an outer diameter and curvature which are approximately the same as the inner diameter and curvature of the inner peripheral surface of the core back portion 51a of the stator 50 (not shown in FIG. 3). The center adjusting portions 11b makes the axial center of the stator 50 and the axial center of the body 11 substantially coincident with each other, i.e., makes the stator 50 substantially coaxial with the body 11. The radially outer edge of each stator placing portion 15 is located at a position corresponding to the center of the opening hole 15b in the radial direction or radially outside that position, and is located radially inside the outer side surface of the core back portion 51a.

The circuit board placing portion 16 is approximately disk-shaped and is formed integrally with the stator placing portions 15. The circuit board placing portion 16 is provided with opening holes 16a between the stator placing portions 15 adjacent to each other in the circumferential direction. The opening holes 16a form a portion of a circuit board fixing portion which fixes the circuit board 60 (not shown in FIG. 2).

Referring to FIG. 4, twelve teeth 51b (shown with dotted line) are arranged in the circumferential direction in this preferred embodiment. At the radially outer edge of each tooth 51b is provided a circumferentially extending portion 51b1 which extends from the tooth 51b in the circumferential direction. The coil 52 is formed between the radially inner side of the circumferentially extended portions 51b1 and the radially outer side of the outer side surface of the core back portion 51a.

In this preferred embodiment, the brushless motor is a three-phase driving type motor employing star connection in which U phase, V phase, and W phase are connected at a single neutral point. Since twelve teeth 51b are provided in this preferred embodiment, the conductive wire is wound continuously around four of the teeth 51b for each of the three phases. For example, the conductive wire is wound continuously from a particular tooth 51ba to the neighboring tooth 51bb. In continuously winding the wires from the tooth 51ba to the tooth 51bb, a connecting wire portion 52a is formed which connects the tooth 51ba and the tooth 51bb. The connecting wire portions 52a are disposed radially outside the core back portion 51a.

On the inner peripheral surface of the core back portion 51a are formed penetrating portions 51a1 which penetrate the core back portion 51a over the entire axial length of the core back portion 51a, i.e., from the upper end surface to the lower end surface in the axial direction. Each penetrating portion 51a1 is recessed radially outward and is located radially inside the connecting wire portions 52a. Also, the penetrating portions 51a1 are provided at the positions corresponding to the locations of the teeth 51b in the circumferential direction. With this configuration, magnetic paths of magnetic fluxes that flow through the stator can be reliably ensured. If the penetrating portions 51a1 are not formed at the positions corresponding to the circumferential locations of the teeth 51b, the width of the core back portion 51a in the radial direction must be widened in order to ensure the magnetic paths, which leads to an increase in size of the stator 50. However, by providing the penetrating portions 51a1 at the positions corresponding to the circumferential locations of the teeth 51b, the magnetic paths can be ensured by the teeth 51b even with a reduced width of the core back portion 51a in the radial direction. The width of the core back portion 51a can thus be reduced in the radial direction.

Referring to FIG. 5, the fixing structure which fixes the bearing bush 10 and the stator 50 to each other is now described.

As shown in FIG. 5, the stator 50 and the bearing bush 10 are fixed to each other with a first fixing member 120. In this preferred embodiment, a screw is used as the first fixing member 120. The first fixing member 120 includes an enlarged portion 121 as a screw head, an inserting portion 122 which extends axially downward from the enlarged portion 121 and is to be inserted through the penetrating portion 51a1 (not shown in FIG. 5) in the core back portion 51a, and a fastening portion 123 which extends axially downward from the inserting portion 122 and is fastened at the opening hole 15b in the stator placing portion 15. The fastening portion 123 is provided with a male thread. The outer diameter of the enlarge portion 121 of the first fixing member 120 is larger than the inner diameter of the penetrating portion 51a1. The lower surface of the enlarged portion 121 comes into contact with the upper surface of the core back portion 51a. Therefore, the stator 50 is fixed by a holding force axially applied between the first fixing member 120 and the stator placing portion 15. Moreover, a radially inner portion of the enlarged portion 121 is partly received in the concave portion 11a. Therefore, the radially inner portion of the enlarged portion 121 is partly located radially inside the inner peripheral surface of the core back portion 51a.

The connecting wire portion 52a1 is inserted through the cutout portion 15a formed on the stator placing portion 15. With this configuration, even when the stator 50 is fixed between the first fixing member 120 and the stator placing portion 15 by the axially applied force, the connecting wire portion 52a1 is prevented from being caught between the lower surface of the core back portion 51a and the upper surface of the stator placing portion 15. Therefore, disconnection of the connecting wire portion 52a1 or separation of the coating in the connecting wire portion 52a1 can be prevented. As a result, a highly reliable brushless motor can be provided.

Since the stator placing portion 15 is formed up to the position corresponding to the center of the opening hole 15b or radially outward therefrom (see FIG. 3), axial deformation of the stator 50 can be prevented even when an axial force is applied to a portion of the stator portion 15 around the opening hole 15b by the first fixing member 120. Moreover, since the stator placing portion 15 is provided radially inside the radial position of the connecting wire portion 52a, contact of the connecting wire portion 52a with the stator placing portion 15 can be prevented. Hence, it becomes possible to provide a highly reliable brushless motor in which disconnection of the conductive wire or a short circuit can be prevented.

<Circuit Board Fixing Unit>

Next, the relation between the stator 50 and the circuit board placing portion 16 is described with reference to FIGS. 6 to 8.

As shown in FIG. 6, an insertion hole 62 is formed in the circuit board 60 at the position corresponding to the bearing bush 10. The cylindrical portion 11 of the bearing bush 10 is inserted through the insertion hole 62, whereby the circuit board 60 and the circuit board placing portion 16 are brought into contact with each other. Rectangular holes 62a are provided to the insertion hole 62 at the positions corresponding to the stator placing portions 15 so as to allow the stator placing portions 15 to be inserted therethrough. Insertion recesses 62b are provided to the insertion hole 62 in the circuit board 60 at the positions corresponding to the opening holes 16a (not shown in FIG. 6) formed in the circuit board placing portion 16. The insertion recesses 62b are formed in such a manner that portions of the inner peripheral surface of the insertion hole 62 are recessed radially outward. The inner diameter of the insertion recess 62b is slightly larger than the inner diameter of the opening hole 16a. Second fixing members 130 are inserted through the insertion recesses 62b to be fastened at the opening holes 16a. A screw which is smaller than the first fixing member 120 is used as the second fixing member 130 in the present embodiment. The second fixing member 130 has an enlarged portion 131 as a screw head, and a fastening portion (not shown) to be fastened at the opening hole 16a. The second fixing member 130 fixes the circuit board 60 by holding it between the lower surface of the enlarged portion 131 of the second fixing member 130 and the upper surface of the circuit board placing portion 16.

Now referring to FIG. 7, the radial positions of the enlarged portions 131 of the second fixing members 130 are located radially inside of the outer peripheral surface of the core back portion 51a. Especially when the shape of the enlarged portion 131 is hemispherical as in the present embodiment (see FIG. 8), the uppermost portions at the top of the enlarged portions 131 are preferably positioned radially inside of the outer peripheral surface of the core back portion 51a when viewed above. With this configuration, the clearance between the stator 50 and the circuit board 60 may be set small in the axial direction, thereby achieving reduction in thickness of the brushless motor. Particularly, it is desired that at least a portion of the radially outer periphery of each enlarged portion 131 is disposed radially inside of the radial position of each connecting wire portion 52a, and more preferably, each of the entire enlarged portions 131 is disposed radially inside of the radial position of each connecting wire portion 52a. This configuration allows for a larger clearance to be taken with respect to the connecting wire portion 52a in the axial direction at the radially outer side of the hemispherically shaped enlarged portion 131, and thus the position to dispose the core back portion 51a of the stator 50 may be further lowered in the axial direction. As a result, reduction in thickness of the brushless motor can be achieved. When the entire enlarged portions 131 are positioned radially inside of the radial positions of the connecting wire portions 52a, the thickness of the brushless motor can be further reduced by the wire diameter of the connecting wire portion 52a.

Particularly in the present embodiment, the cylindrical portion 11 of the bearing bush 10 is shaped substantially triangular, whereby it becomes possible to reduce the thickness of the cylindrical portion 11 in the radial direction at the positions where the second fixing members 130 are disposed, and to dispose the second fixing members 130 even more radially inward. Molding of the bearing bush becomes difficult when the cylindrical portion 11 is made thin merely to conform to the bearing housing portions 12. In the present embodiment, however, the bearing bush is formed in such a manner that the stator placing portions 15 are coupled thereto, and thus a defective molding can be prevented even when the thickness of the cylindrical portion 11 is reduced in the radial direction.

Referring further to FIG. 8, the circumferential positions of the second fixing members 130 are located between the teeth 51b adjacent to one another in the circumferential direction. It is particularly desired that the second fixing members 130 are disposed between the coils 52 adjacent to one another in the circumferential direction. By this arrangement, the configuration is achieved which the lower end portion of each coil 52 overlaps with at least a portion of the upper portion of each enlarged portion 131 of the second fixing member 130 in the radial direction. Therefore, further reduction in thickness of the brushless motor can be achieved.

While an embodiment of brushless motor according to the present invention has been described above, the present invention is not limited to the above described embodiment, and various changes and modifications can be made within the scope of the appended claims, without departing from the spirit and the scope of the invention.

For example, although the ball bearings 21 and 22 are used as the bearing unit 20 of the brushless motor according to the present invention, the present invention is not limited thereto. It is only necessary that the shaft 80 is supported freely rotatably, and a sleeve made of an oil-impregnated sintered compact may be fixed in the bearing bush 10.

What is claimed is:

1. A brushless motor comprising:
a rotor portion which rotates about a predetermined center axis and including a rotor magnet;
a bearing unit which supports the rotor portion in a rotatable manner;
a stator opposed to the rotor magnet in a radial direction perpendicular to or substantially perpendicular to the center axis, wherein the stator includes: a stator core having a plurality of teeth extending in the radial direction and an annular core back portion connecting the teeth to one another, the core back portion having a penetrating hole axially penetrating therethrough; a coil formed by winding a conductive wire around each of the teeth; and a connecting wire portion, formed by a portion of the conductive wire arranged between two of the teeth, operable to continuously connect the two teeth while retaining a conductive state; and
a base including a hollow body and a stator placing portion, the hollow body supporting the bearing unit and having an outer side surface facing an inner side surface of the core back portion of the stator, the stator placing portion being in contact with an axially lower surface of the core back portion and having a substantially flat surface substantially perpendicular to the center axis, wherein
the stator placing portion has an opening hole at a position corresponding to the penetrating hole, wherein the stator placing portion is formed at a first horizontal level, wherein the stator placing portion is provided with a cutout portion in a step shape formed at a second horizontal level, the second horizontal level being lower than the first horizontal level, wherein the cutout portion is formed such that a radially outer edge of the opening hole is located radially outside that of the stator placing portion,
the stator is fixed to the base with a fixing member inserted through the penetrating hole and the opening hole, and
an upper surface of the stator placing portion and the connecting wire portion are spaced apart from each other, wherein the connecting wire portion runs through a space between the first horizontal level of the stator placing portion and the cutout portion.

2. The brushless motor according to claim 1, wherein
the stator placing portions are provided at three locations which are spaced apart from one another in a circumferential direction, and
each of the stator placing portions adjacent to each other in the circumferential direction has a substantially flat surface in proximity to the outer peripheral surface of the hollow body.

3. The brushless motor according to claim 1, wherein the hollow body of the base is provided with a center adjusting portion which makes an axial center of the stator substantially coincide with an axial center of the hollow body.

4. The brushless motor according to claim 3, wherein
the center adjusting portion is formed at approximately the same location as the stator placing portion in the circumferential direction, and
the center adjusting portion is formed from a portion of the outer peripheral surface adjacent to the opening hole in the circumferential direction, the outer peripheral surface being approximately the same in diameter with the inner peripheral surface of the core back portion.

5. The brushless motor according to claim 1, wherein
the fixing member is formed in a substantially circular cylindrical shape and includes:
a fastening portion which fits into the base;
an inserting portion which is inserted through the penetrating portion of the core back portion; and
an enlarged portion which has an outer diameter larger than an inner diameter of the penetrating portion, and holds the stator between itself and the stator placing portion by contacting an upper surface of the core back portion; and
a portion of the enlarged portion is positioned radially inward from the inner peripheral surface of the core back portion.

6. The brushless motor according to claim 1, wherein the stator placing portion is arranged up to a position corresponding substantially to or outward from a center of the opening hole in the radial direction, the position also being inside of the connecting wire portion in the radial direction.

7. The brushless motor according to claim 1, wherein a concave portion is formed in the outer peripheral surface of the hollow body at a location corresponding to the opening hole formed in the stator placing portion in the circumferential direction, the concave portion is recessed toward the center axis in the radial direction.

8. The brushless motor according to claim 1, wherein the penetrating portion in the stator is formed at a position corresponding to a location in the circumferential direction where the tooth is formed.

9. The brushless motor according to claim 1, wherein
a circuit board for controlling rotation of the rotor portion is disposed at a position axially below the stator core,
a circuit board placing portion for placing the circuit board is formed in an axially lower portion of the base, the circuit board placing portion extending radially outward from the cylindrical portion,
a circuit board fixing unit for fixing the circuit board to the base is formed in the circuit board placing portion, and
the circuit board fixing unit is formed between the teeth of the stator adjacent to one another in the circumferential direction.

10. The brushless motor according to claim 9, wherein the circuit board fixing unit is formed between the coils adjacent to one another in the circumferential direction.

11. The brushless motor according to claim 9, wherein at least a portion of the circuit board fixing unit is formed radially inside of the coil.

12. The brushless motor according to claim 9, wherein at least a portion of the circuit board fixing unit is formed radially inside of the connecting wire portion.

13. The brushless motor according to claim 9, wherein
the circuit board fixing unit includes:
an opening hole formed in the circuit board placing portion of the base;
a penetrating portion formed in the circuit board at a position opposing the opening hole; and
a fixing member having an enlarged portion and a fastening portion, the enlarged portion having an outer diameter larger than the opening hole, the fastening portion being fastened on to the opening hole, and
the circuit board is held between an upper surface of the circuit board placing portion and a lower surface of the enlarged portion.

14. The brushless motor according to claim 13, wherein at least an upper portion of the enlarged portion of the fixing member is formed in a substantially hemispherical shape.

15. The brushless motor according to claim 13, wherein an upper end portion of the fixing member is disposed at a position which is axially higher than a lower end portion of the coil and is axially lower than a lower surface of the core back portion.

16. The brushless motor according to claim 1, further comprising:
a shaft disposed in the rotor portion coaxially with the center axis; and
a gear disposed in an axially lower portion of the shaft for transmitting rotary torque to a gear as a matching member by engaging with the matching member.

17. The brushless motor according to claim 1, wherein
the stator placing portions are provided at three positions which are spaced apart from one another in the circumferential direction, and
the hollow body is formed into a substantially triangular shape which links the stator placing portions.

18. The brushless motor according to claim 5, wherein the connecting wire portion is located at a radially outward position of the fastening portion.

* * * * *